United States Patent
Nissen et al.

(10) Patent No.: US 10,100,816 B2
(45) Date of Patent: Oct. 16, 2018

(54) ELECTRICITY GENERATION PROCESS

(71) Applicant: Applied Biomimetic A/S, Nordborg (DK)

(72) Inventors: Steen Søndergaard Nissen, Ellicott City, MD (US); Jørgen Mads Clausen, Sønderborg (DK)

(73) Assignee: APPLIED BIOMIMETIC A/S, Nordborg (DK)

( * ) Notice: Subject to any disclaimer, the term of this patent is extended or adjusted under 35 U.S.C. 154(b) by 0 days.

(21) Appl. No.: 15/509,583

(22) PCT Filed: Sep. 8, 2015

(86) PCT No.: PCT/EP2015/070431
§ 371 (c)(1),
(2) Date: Mar. 8, 2017

(87) PCT Pub. No.: WO2016/037999
PCT Pub. Date: Mar. 17, 2016

(65) Prior Publication Data
US 2018/0135604 A1    May 17, 2018

(30) Foreign Application Priority Data

Sep. 8, 2014 (GB) .................................. 1415847.1
Jun. 12, 2015 (GB) .................................. 1510307.0

(51) Int. Cl.
*F03G 7/04* (2006.01)
(52) U.S. Cl.
CPC ...................................... *F03G 7/04* (2013.01)
(58) Field of Classification Search
CPC ..... F03G 7/04; B01D 61/002; B01D 2311/02; B01D 2311/04; B01D 2311/08
See application file for complete search history.

(56) References Cited

U.S. PATENT DOCUMENTS

2002/0178723 A1   12/2002   Bronicki et al.
2010/0024423 A1    2/2010   McGinnis et al.
(Continued)

FOREIGN PATENT DOCUMENTS

AU    2007319995 B2    8/2012
CN       203505325 U    4/2014
(Continued)

OTHER PUBLICATIONS

O'Hern et al., "Selective Ionic Transport through Tunable Subnanometer Pores in Single-Layer Graphene Membranes", Nano Letter, American Chemical Society, 2014, pp. 1234-1241, vol. 14.
(Continued)

*Primary Examiner* — Jonathan Matthias
(74) *Attorney, Agent, or Firm* — Jackson Walker LLP; Christopher J. Rourk

(57) ABSTRACT

A process for the generation of electricity comprises the steps of extracting a warm saline stream from a geothermal formation, and converting latent osmotic energy present in said stream into electricity by passage through an osmotic power unit in which said stream is passed over one side of a semi-permeable membrane which permits the passage of water but not the passage of salts, an aqueous stream of lower salinity than said stream being passed over the other side of said membrane. The temperature of said warm saline stream is reduced before said stream enters the osmotic power unit by passage through a thermal power unit in which thermal energy present in said stream is converted into electricity.

22 Claims, 3 Drawing Sheets

(56) References Cited

U.S. PATENT DOCUMENTS

| | | | |
|---|---|---|---|
| 2010/0071366 A1 | 3/2010 | Klemencic | |
| 2010/0192575 A1* | 8/2010 | Al-Mayahi | B01D 61/002 60/671 |
| 2011/0044824 A1* | 2/2011 | Kelada | F03G 7/005 417/53 |
| 2011/0046074 A1 | 2/2011 | Kumar et al. | |
| 2011/0272166 A1 | 11/2011 | Hunt | |
| 2013/0318870 A1 | 2/2013 | Lim | |
| 2013/0232973 A1 | 9/2013 | McBay | |
| 2014/0026567 A1 | 1/2014 | Paripati et al. | |
| 2014/0102095 A1 | 4/2014 | Shim et al. | |
| 2014/0138956 A1 | 5/2014 | Sano et al. | |

FOREIGN PATENT DOCUMENTS

| | | |
|---|---|---|
| DE | 102009014576 A1 | 9/2010 |
| JP | 2014117653 A | 6/2014 |
| WO | 2004/011600 A2 | 2/2004 |
| WO | 2005/017352 A1 | 2/2005 |
| WO | 2010/091078 A2 | 8/2010 |
| WO | 2012/140659 A1 | 10/2012 |
| WO | 2013/033082 A1 | 3/2013 |
| WO | 2013/043118 A1 | 3/2013 |
| WO | 2013/090901 A2 | 6/2013 |
| WO | 2013/164541 A2 | 11/2013 |

OTHER PUBLICATIONS

Cohen-Tanugi et al., "Water Desalination across Nanoporous Graphene", Nano Letter, American Chemical Society, 2012, pp. 3602-2308, vol. 12.

Helfer et al., "Osmotic power with Pressure Retarded Osmosis: Theory, performance and trends—A review", Journal of Membrane Science, 2014, pp. 337-358, vol. 453.

Lin et al., "Hybrid Pressure Retarded Osmosis-Membrane Distillation System for Power Generation from Low-Grade Heat: Thermodynamic Analysis and Energy Efficiency", Environmental Science & Technology, American Chemical Society, 2014, pp. 5306-5313, vol. 48.

The International Search report and the written opinion issued by European Patent Office dated Apr. 11, 2016 for International patent application No. PCT/EP2015/070431.

The International preliminary report on patentability issued by European Patent Office dated Mar. 14, 2017 for International patent application No. PCT/EP2015/070431.

The Combined Search and Examination Report issued by UK Intellectual Property Office dated Feb. 24, 2015 for UK Patent Application No. 1415847.1.

McGinnis et al., "A novel ammonia-carbon dioxide osmotic heat engine for power generation", Journal of Membrane Science, 2007, pp. 13-19, vol. 305.

* cited by examiner

ELECTRICITY GENERATION PROCESS

CROSS-REFERENCE TO RELATED APPLICATIONS

The present application is a 35 U.S.C. 371(c) National Stage Application of International Application No. PCT/EP2015/070431, filed on Sep. 8, 2015, which claims priority to GB Application No. 1415847.1, filed Sep. 8, 2014, and GB Application No. 1510307.0, filed Jun. 12, 2015, which are incorporated herein by reference in their entireties.

FIELD OF INVENTION

The invention relates to a process for the generation of electricity. Specifically, it relates to the generation of electricity from warm saline streams obtained from geothermal sources.

BACKGROUND OF THE INVENTION

Much effort is currently being directed towards novel and renewable sources of energy which do not rely on fossil fuels.

One such area of research is the process known as pressure retarded osmosis (PRO). In this process, a semi-permeable membrane is used to separate a less concentrated solution from a more concentrated solution. The membrane causes solvent to pass from the less concentrated solution (with low osmotic pressure) to the more concentrated solution (with high osmotic pressure) by osmosis, and this leads to an increase in pressure on the side of the membrane to which the solvent diffuses. This pressure can be harnessed to generate electricity. A small number of PRO plants are in operation around the world, and these generally use differences in salinity as the driver for osmosis, typically using fresh water from a river or lake as the feed stream for the less concentrated solution, and sea water for the more concentrated solution. Helfer et al, J. Membrane Sci. 453 (2014) 337-358 is a review article describing PRO. Typically, PRO schemes to date have used seawater and river water mixing, and in pilot-scale plants the process has been found to be uneconomic due to low power densities achieved. It has been suggested that a power density of around 5 W/m$^2$ membrane represents a level of power generation above which PRO may become economically viable. Outside of laboratories it has not generally been possible to achieve this level of power density using existing membrane technology in river/seawater mixing schemes.

A number of attempts have been made to harness the energy found in underground formations in processes involving osmosis. WO 2013/164541 describes a method for generating power by direct osmosis, in which the more concentrated solution is "production water", while the less concentrated solution is fresh water or sea water. Production water is water obtained after separation from a hydrocarbon stream during hydrocarbon production. WO 2013/164541 also mentions that a brine stream obtained from an underground formation can be used as the more concentrated solution.

However, most attempts to generate power by osmosis and also to harness the energy present in geothermal streams use a completely different approach. This is described in a number of documents which envisage using the heat obtainable from geothermal sources as a driver for closed-loop osmosis systems. US 2010/0024423 explains the difference between an "open loop" PRO system in which the feeds are typically fresh water and sea water and the spent solutions are discharged back into the environment, and "closed loop" system in which a single solution is separated, for example by evaporation, into a more-concentrated and a less-concentrated solution. Such separation requires energy, which may be supplied by low-grade heat sources such as industrial waste heat, or renewable heat sources such as geothermal heat sources. The particular invention of US 2010/0024423 is a closed loop osmotic system in which the draw solution is ammonia and carbon dioxide. Other documents describing a closed loop system in which a heat transfer step is used to separate a solution into more-concentrated and less-concentrated solutions, the heat being supplied from a geothermal source, include US 2014/0026567 and Lin et al, Environ. Sci. Technol. 2014, 48, 5306-53113.

No known process, however, harvests the maximum available amount of energy latent in the warm saline streams present in underground geothermal formations. We have now found a process capable of increasing the efficiency of energy extraction from warm saline streams present in underground geothermal formations.

SUMMARY OF THE INVENTION

In one aspect, the present invention provides a process for the generation of electricity, the process comprising the steps of:
  extracting a warm saline stream from a geothermal formation, and
  converting latent osmotic energy present in said stream into electricity by passage through an osmotic power unit in which said stream is passed over one side of a semi-permeable membrane which permits the passage of water but not the passage of salts, an aqueous stream of lower salinity than said stream being passed over the other side of said membrane, and wherein
  the temperature of said warm saline stream is reduced before said stream enters the osmotic power unit by passage through a thermal power unit in which thermal energy present in said stream is converted into electricity.

In another aspect, the present invention provides, a process for the generation of electricity, the process comprising the steps of:
  extracting a warm saline stream from a geothermal formation, and
  converting thermal energy present in said stream into electricity by passage through a thermal power unit, and wherein
  the salinity of said warm saline stream is reduced before said stream enters the thermal power unit by passage through an osmotic power unit in which said stream is passed over one side of a semi-permeable membrane which permits the passage of water but not the passage of salts, an aqueous stream of lower salinity than said stream being passed over the other side of said membrane thereby converting latent osmotic energy present in said stream into electricity.

In another aspect, the present invention provides a process for the generation of electricity, which comprises extracting a warm saline stream from a geothermal formation, and:
  (a) converting thermal energy present in said stream into electricity; and
  (b) converting latent osmotic energy present in said stream into electricity by passage through an osmotic power unit in which said stream is passed over one side of a semi-permeable membrane which permits the passage of water but not the passage of salts, an aqueous stream of lower salinity than said stream being passed over the other side of said membrane.

In another aspect, the present invention provides a power generation system comprising:
- a connection to a warm saline stream extracted from a geothermal formation,
- an osmotic power unit arranged to generate electricity through Pressure Retarded Osmosis (PRO) using the difference in salinity between a high-salinity input stream and a low-salinity input stream, and
- a thermal power unit arranged to generate electricity by extracting thermal energy from the warm saline stream thereby producing a cooled output stream, and wherein the system is arranged such that the cooled output stream of the thermal power unit is passed to the osmotic power unit for use as the high-salinity input stream.

In another aspect, the present invention provides a process for the generation of electricity, which comprises extracting a warm saline stream from a geothermal formation, and:
- converting latent osmotic energy present in said stream into electricity by passage through an osmotic power unit in which said stream is passed over one side of a semi-permeable membrane which permits the passage of water but not the passage of salts, an aqueous stream of lower salinity than said stream being passed over the other side of said membrane, and
- wherein the osmotic power unit contains more than one osmosis unit each comprising a semipermeable membrane which permits the passage of water but not the passage of salts.

DETAILED DESCRIPTION OF INVENTION

Figure 1:
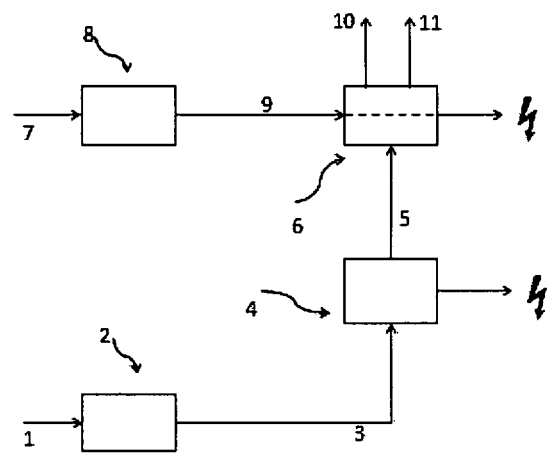
FIG. 1 shows a schematic view of one embodiment of the invention in which a warm saline geothermal stream is passed first through a heat exchanger and secondly through an osmotic power unit.

The process of the present invention may increase the efficiency of energy generation using saline streams from geothermal formations. The process of the present invention extracts both thermal energy and latent osmotic energy from the same warm saline stream obtained from a geothermal formation. In addition to the increase in power generation which may be expected from extracting two different types of energy from the same source, the two energy extraction processes may complement each other to reduce inefficiencies in each process caused by certain characteristics of warm saline steams from geothermal formations.

Saline streams from geothermal formations may provide increased salt concentrations compared to, for example, sea water. Increased salt concentrations in the high-salinity input stream of an osmotic power unit may allow for increased power density during pressure retarded osmosis (PRO). Saline streams from geothermal formations may also carry a lower risk of the osmotic membrane being fouled and/or reduce the amount of pretreatment required in comparison to seawater, or other prior art high-salinity sources, as saline streams from geothermal formations are typically isolated from the wider environment. However, the high temperatures of such saline streams may reduce the operating efficiency of currently-available osmotic membranes and/or reduce the lifetime of currently-available osmotic membranes.

Saline streams from geothermal formations may provide a useful source of thermal energy for electricity generation. However, the very high salt content of such geothermal streams may result in precipitation of solid salt(s) as the temperature drops during the generation process. Such precipitation may result in fouling of the thermal power unit and/or reduce efficiency in the thermal electricity generating process.

In the case that the thermal power unit is located on the flow path between the geothermal formation and the inlet to the osmotic power unit, the output of the thermal power unit is a cooled saline stream, which is passed to the osmotic power unit. The cooler (in comparison to the warm stream from the geothermal formation) saline stream may be better suited to the osmotic power generation process than the warm stream obtained from the geothermal formation. For example, the cooler saline stream may result in an increase in the efficiency of the osmotic membrane and/or the lifetime of the membrane.

If the osmotic power unit is located on the flow path between the geothermal formation and the inlet to the thermal power unit, the output of the osmotic power unit is a warm stream of reduced salinity, which is passed to the thermal power unit. The reduction in the salinity of the warm stream which occurs during the osmotic power generation process may mean that the precipitation of solid salts(s) as the temperature drops during the thermal power generation process is reduced thereby reducing fouling and/or increasing the efficiency of the thermal generation process.

For convenience the process of converting thermal energy present in the warm saline stream extracted from a geothermal formation into electricity may be referred to hereafter as step (a). The process of converting latent osmotic energy present in said stream into electricity may be referred to hereafter as step (b).

The process of the invention uses a warm saline stream obtained from a geothermal formation. The warm stream is extracted from the ground using conventional drilling techniques and is generally subject to any necessary pretreatment steps prior to carrying out steps (a) and (b). For example, filtration to remove solid material may be necessary, as might other conventional processes depending on the exact nature of the warm stream.

A thermal power unit may be defined as a unit which converts thermal energy into electricity. Any suitable means may be used to convert thermal energy contained in the geothermal stream into electricity. For example, the stream may be passed through a thermal power unit comprising a heat exchanger. Alternatively, particularly where the stream is of very high temperature and high pressure, the thermal power unit may comprise a steam generator. Steam from the geothermal stream may be used directly to drive the steam generator. Conventional means of handling warm streams which may be in either the liquid phase or the gaseous phase or both are well known, and any such means may be used in the present invention. The use of a heat exchanger is preferred in many circumstances, especially where the initial temperature of the warm saline stream emerging from the geothermal formation is less than 150° C.

The geothermal formation may yield a warm saline stream having a temperature of at least 45° C., preferably at least 55° C. For example, the geothermal formation may yield a warm saline stream having a temperature between 45° C. and 70° C. Passing the warm saline stream through the thermal power unit may reduce the temperature of said stream by at least 50%. For example, passing through the thermal power unit may reduce the temperature of the stream from between 45° C. and 70° C. to between 15° C. and 20° C.

The salt content of the warm saline stream may be anything up to saturation. Preferably the salt content is at least 10% wt, preferably at least 15% wt, especially at least 20% wt. It will be understood that saline streams from geothermal sources may contain a wide variety of dissolved salts, with a preponderance of sodium chloride, and that "salt content" refers to total salt content. The exact nature of the salt(s) present in such streams is not important.

For step (a), a warm stream is passed through a thermal power unit, for example one or more heat exchangers and/or steam generators, to extract thermal energy which is converted into electricity. Any type of conventional thermal power generation system may be used. If step (a) is carried out before step (b), the output from step (a) is a cooled saline stream, and this is used as the feed for step (b). If step (a) is carried out after step (b), the output from step (a) will be a waste stream which may be disposed of as required, for example by re-injection into the geothermal formation, or discharge into a neighboring sea, river or lake.

Step (b) is powered by osmosis, and converts latent osmotic energy into electricity. An osmotic power unit is a unit which converts latent osmotic energy into electricity. Any suitable osmotic power unit may be used in the process of the present invention. The key feature of such a unit is the presence of a semi-permeable membrane which permits the passage of water but not of dissolved salt(s). Such membranes are commercially available, and any suitable membrane may be used. In addition, novel types of membrane, for example membranes based on a lipid or amphiphilic polymer matrix containing aquaporins, which are proteins which permit the passage of water but no other substance, may be used. Such membranes are described in for example WO 2004/011600, WO 2010/091078, US 2011/0046074 and WO 2013/043118. Other novel types of membrane include graphene-based membranes, for example those described by Cohen-Tanugi et al, Nano Lett. 2012, 12(7), pp. 3602-3608 and O'Hern et al, Nano Lett. 2014, 14(3), pp. 1234-1241. More than one membrane may be present, and combinations of different types of membranes may be used. Thus the osmotic power unit may contain more than one osmosis unit each containing a semi-permeable membrane. As well as at least one membrane, an osmotic power unit will include means for converting pressure or flow generated by osmosis into electricity. Typically this means will be a turbine connected to a generator, but any suitable means may be used.

As well as the saline feed stream originating from the geothermal formation, step (b) requires a feed stream which is an aqueous stream having lower salinity than the saline stream originating from the geothermal formation. This lower salinity stream may be obtained from any source, but is typically sea water, fresh or brackish water obtained, for example, from a river or a lake, or waste water obtained from an industrial or municipal source. The economics of a process according to the invention are likely to be particularly favourable when a geothermal well is located adjacent a sea, river or lake, with sourcing of the necessary streams and disposal of the waste streams both being easy and cheap. Throughout this specification, unless the context requires otherwise, "lower salinity" should be understood to include zero salinity.

The initial inputs to step (b) are thus one higher salinity stream, and one lower salinity stream. After passage over a membrane, the first stream (initial higher salinity) will be reduced in salinity, while the second stream (initial lower salinity) will be increased in salinity. The output streams from a first pass over the membrane will both have lower salinity than the original warm saline stream, and higher salinity than the original lower salinity stream—at equilibrium, the two streams would have equal salinity, but this is unlikely to be achieved in practice. Therefore, either output stream can be reused as either the first stream or the second stream for a second pass over the original membrane, or as either the first stream or the second stream over a second membrane. These reused streams may be used alone, or merged with other input streams. The high concentrations of salt in warm saline streams from geothermal formations may facilitate the use of multi-step osmotic power generation. Each step may have a different pressure and/or flux setting depending on the difference in salinity between the initial input streams for each pass. Tailoring the pressure and/or flux setting in this manner may increase the efficiency of the process, particularly where a plurality of steps may be used as with a warm saline stream from a geothermal formation. As long as an outgoing stream from an osmosis unit has higher salinity than the initial input stream of lower salinity, it is possible to operate an additional osmosis unit. The optimal number of cycles will depend on the initial content of the streams, the efficiency of the membranes, and the flow rates selected.

If step (b) is carried out after step (a), the ultimate output from step (b) will be a waste stream from the first side of the membrane and a waste stream from the second side of the membrane, and these streams may be handled separately or merged. The waste stream(s) may be disposed of as required, for example by re-injection into the geothermal formation, or discharge into a neighboring sea, river or lake. If step (b) is carried out before step (a), the ultimate output from step (b) will be one stream derived from the original warm saline stream which now has reduced salinity but which still retains heat and is at a temperature above ambient temperature. This stream is then used as the feed for step (a).

The efficiency of the process of the invention will depend upon the initial temperature and pressure of the warm saline stream, and also upon the quantity and nature of the salt(s) the stream contains. Another key feature determining the efficiency of the process will be the performance of the semi-permeable membrane, and optimization depends on a combination of two factors: the flux of water obtainable through the membrane, and the efficiency with which the membrane can exclude salts. The use of multiple osmosis units as described above can also affect overall process efficiency.

One embodiment of the invention is illustrated schematically in FIG. 1. In FIG. 1, a warm saline stream 1 from a geothermal source is passed through one or more pre-treatment steps 2 and the resulting stream 3 is passed to a heat exchanger 4. In the heat exchanger 4, thermal energy is extracted and ultimately converted to electricity by conventional means not shown, and the warm saline stream 3 is cooled and exits as cooled saline stream 5. Stream 5 is passed to osmotic power unit 6 where it is caused to flow at one side of a semi-permeable membrane (not shown) which permits passage of water but not of salts. An aqueous stream 7 which is of lower salinity than streams 1, 3 and 5, which may for example be sea water, water from a river or lake, or waste water, is passed through one or more pre-treatment steps 8 and the resulting stream 9 is passed to osmotic power unit 6 where is it caused to flow at the other side of the semi-permeable membrane. Within osmotic power unit 6, water flows from stream 9 into stream 5 via the semi-permeable membrane causing an increase in pressure due to the increased volume in a confined space, and this excess pressure is ultimately converted to electricity by conventional means not shown. Output from the osmotic power unit 6 forms one or two aqueous exit streams 10 and/or 11 which are disposed of as required, for example by re-insertion into the geothermal formation from which stream 1 was extracted or into the water-source, for example sea, river or lake, from which stream 7 was extracted.

Figure 2:
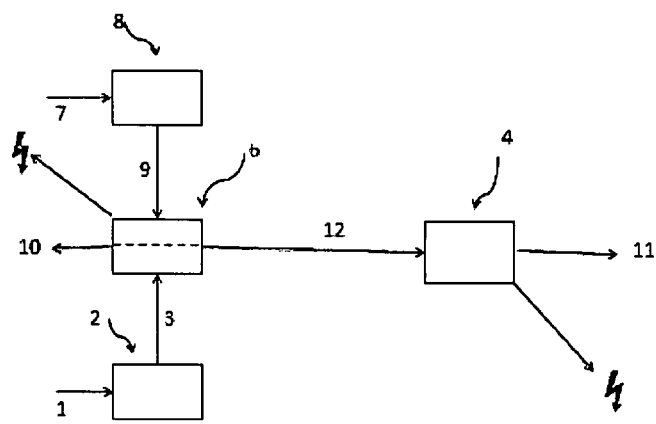
FIG. 2 shows a schematic view of an alternative embodiment of the invention in which a warm saline geothermal stream is passed first through an osmotic power unit and secondly through a heat exchanger.

An alternative embodiment is shown in FIG. 2. In FIG. 2, a warm saline stream 1 from a geothermal source is passed through one or more pre-treatment steps 2 and the resulting stream 3 is passed to an osmotic power unit 6 where it is caused to flow at one side of a semi-permeable membrane (not shown) which permits passage of water but not of salts. An aqueous stream 7 which is of lower salinity than streams 1 and 3, which may for example be sea water, water from a river or lake, or waste water, is passed through one or more pre-treatment steps 8 and the resulting stream 9 is passed to osmotic power unit 6 where is it caused to flow at the other side of the semi-permeable membrane. Within osmotic power unit 6, water flows from stream 9 into stream 3 causing an increase in pressure due to the increased volume in a confined space, and this excess pressure is ultimately converted to electricity by conventional means not shown. Exit stream 12 from osmotic power unit 6 corresponds to input stream 3, now increased in volume by passage of water from stream 9 through the semipermeable membrane. Stream 12 is still above ambient temperature, and is passed to means for extracting thermal energy, for example heat exchanger 4. In the heat exchanger 4, thermal energy is extracted and ultimately converted to electricity by conventional means not shown. The hot stream 12 is cooled and exits as stream 11. Exit streams 10 and 11 are disposed of as required, for example by re-insertion into the geothermal formation from which stream 1 was extracted or into the water-source, for example sea, river or lake, from which stream 7 was extracted.

Figure 3:
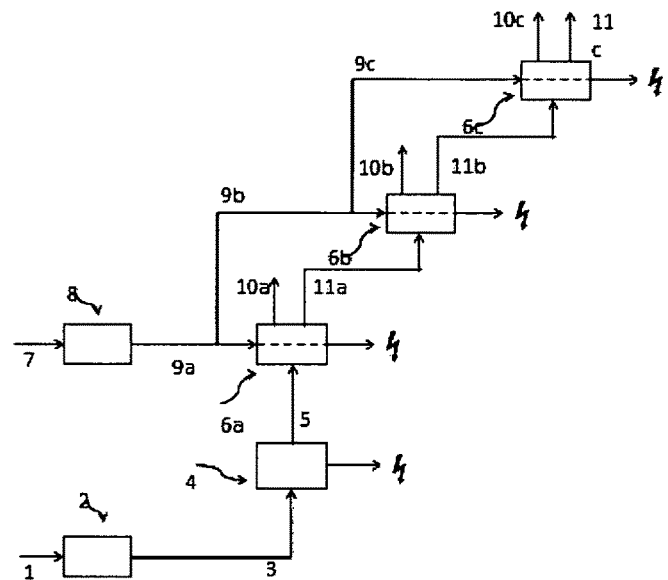
FIG. 3 shows a variant of FIG. 1 in which multiple osmosis units are used.

FIG. 3 shows a variant of the process of FIG. 1 in which multiple osmosis units 6a, 6b and 6c are connected in series in a power generation system according to the invention. In FIG. 3, symbols 1 to 5, 7, 8 and 10 have the meanings given in FIG. 1. Each osmosis unit 6a, 6b and 6c contains a semi-permeable membrane (not shown) which permits passage of water but not of salts. Original high saline stream 5 flows at one side of the semipermeable membrane, while lower salinity stream 9a flows at the other side. Output stream 11a from osmosis unit 6a, which has a salt content lower than that of original geothermal input streams 3 and 5, is fed to a second osmosis unit 6b where it is passed over one side of a semi-permeable membrane. A second input stream 9b of relatively low salinity water is obtained from original aqueous stream 7 after passage through one or more pre-treatment steps 8. Although the difference in salinity between streams 11a and 9b is lower than the difference in salinity between streams 5 and 9a, there is still a difference in salinity, and electricity can be generated by osmosis.

Output stream 11b from osmosis unit 6b, which has a salt content lower than that of original geothermal input streams 3 and 5, and also lower than stream 11a, is fed to a third osmosis unit 6c where it is passed over the other side of a semi-permeable membrane from a further input stream 9c of relatively low salinity water. Although the difference in salinity between streams 11b and 9c is lower than the difference in salinity between streams 5 and 9a, or between streams 11a and 9b, there is still a difference in salinity, and electricity can be generated by osmosis. Output streams from the process of FIG. 3 are aqueous exit streams 10a, 10b, 10c and 11c, and these streams may be disposed of as required.

Figure 4:
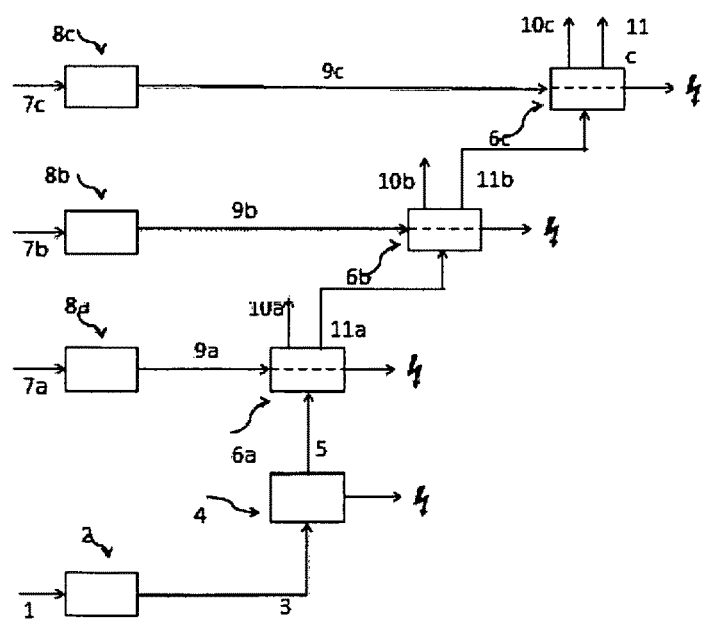
FIG. 4 shows a variant of FIG. 3 with alternative input streams.

FIG. 4 shows a variant of FIG. 3 in which input streams 9a, 9b and 9c of relatively low salinity water are provided as separate input streams 7a, 7b and 7c, each undergoing one or more pre-treatments steps 8a, 8b and 8c.

Figure 5:
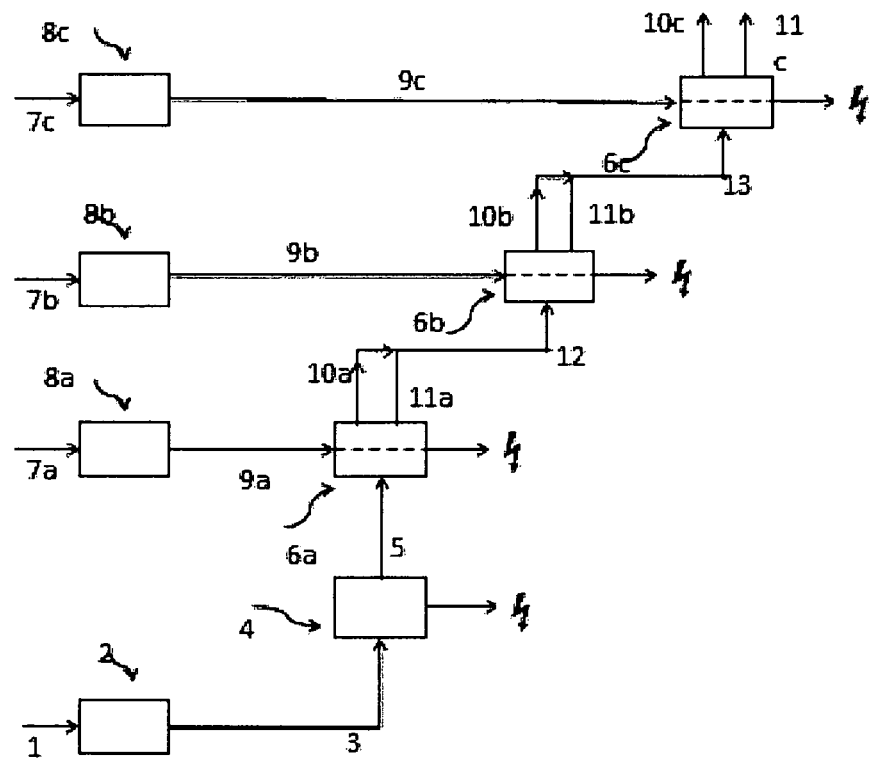
FIG. 5 shows a variant of FIG. 4 with alternative output streams.

FIG. 5 shows a variant of FIG. 4 in which output streams are handled in a different way. Outlet streams 10a and 11a from osmosis unit 6a are merged, and at least part of the merged stream is provided as input stream 12 to osmosis unit 6b. The merged stream 12 will have a salt content lower than that of original geothermal input streams 3 and 5, and although the difference in salinity between stream 12 and stream 9b is lower than the difference in salinity between streams 5 and 9a, there is still a difference in salinity, and electricity can be generated by osmosis. Similarly, outlet streams 10b and 11b from osmosis unit 6b are merged, and at least part of the merged stream is provided as input stream 13 to osmosis unit 6c.

It will be understood that FIGS. 3, 4 and 5 show an osmosis power unit consisting of 3 osmosis units each containing a semi-permeable membrane, but that any suitable number of units can be used, the choice being determined by a combination of technical and economic factors. In general, the higher the initial salinity of the warm saline stream 1, the higher the number of osmosis units which may be used.

Figure 6:
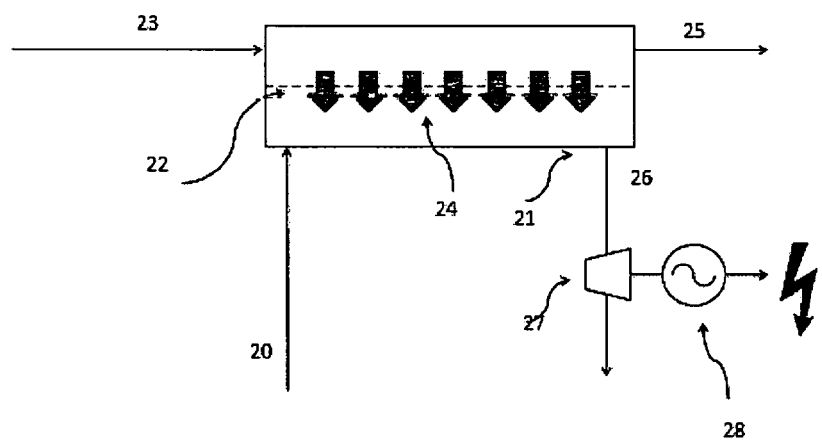
FIG. 6 shows an osmotic power unit 6 of FIGS. 1 and 2.

FIG. 6 shows more details of an osmotic power unit 6 of FIGS. 1 and 2. A saline input stream 20 from a geothermal source (which may for example be stream 3 of FIG. 1 or stream 5 of FIG. 2) is passed to an osmosis unit 21 containing a semi-permeable membrane 22 which permits passage of water but not of salts, and flows at one side of membrane 22. An aqueous stream 23 which is of lower salinity than stream 20 enters osmosis unit 21 and flows at the other side of membrane 22. Arrows 24 show the direction of water transport by osmosis across membrane 22. An output stream 25 consisting of original input stream 20 now containing a higher concentration of salt, leaves osmosis unit 21. An output stream 26 consisting of original input stream 20 now containing a lower concentration of salt, leaves osmosis unit 21 via a turbine 27 which drives a generator 28 thus producing electricity.

The invention claimed is:

1. A process for the generation of electricity, the process comprising the steps of:
   receiving a saline stream from a geothermal formation at a first system; and
   converting latent osmotic energy present in said saline stream into electricity by passage through an osmotic power unit in which said saline stream is passed over one side of a semi-permeable membrane which permits the passage of water but not the passage of salts, an aqueous stream of lower salinity than said saline stream being passed over the other side of said membrane, and wherein the temperature of said saline stream is reduced before said stream enters the osmotic power unit by passage through a thermal power unit in which thermal energy present in said stream is converted into electricity.

2. A process as claimed in claim 1, in which the temperature of the saline stream is reduced by passing said stream through a heat exchanger.

3. A process as claimed in claim 1, in which the saline stream has a temperature of at least 45° C.

4. A process as claimed in claim 3, in which the saline stream has a temperature of at least 55° C.

5. A process as claimed in claim 1, in which the saline stream has a salt content of at least 10% wt.

6. A process as claimed in claim 5, in which the saline stream has a salt content of at least 15% wt.

7. A process as claimed in claim 1, in which the aqueous stream of lower salinity is sea water, fresh water or brackish water obtained from a river or lake, or waste water obtained from an industrial or municipal source.

8. A process as claimed in claim 1, in which the osmotic power unit contains more than one osmosis unit each comprising a semipermeable membrane which permits the passage of water but not the passage of salts.

9. A process as claimed in claim 8, in which an output stream from one osmosis unit is used as an input stream for a second osmosis unit.

10. A power generation system comprising:
a connection to a saline stream extracted from a geothermal formation;
an osmotic power unit arranged to generate electricity through Pressure Retarded Osmosis (PRO) using the difference in salinity between a high-salinity input stream and a low-salinity input stream; and
a thermal power unit arranged to generate electricity by extracting thermal energy from the saline stream thereby producing a cooled output stream, and wherein the system is arranged such that the cooled output stream of the thermal power unit is passed to the osmotic power unit for use as the high-salinity input stream.

11. A process for the generation of electricity, which comprises:
extracting a saline stream from a geothermal formation; and
converting latent osmotic energy present in said stream into electricity by passage through an osmotic power unit in which said stream is passed over one side of a semi-permeable membrane which permits the passage of water but not the passage of salts, an aqueous stream of lower salinity than said stream being passed over the other side of said membrane, and wherein the osmotic power unit contains more than one osmosis unit each comprising a semipermeable membrane which permits the passage of water but not the passage of salts.

12. A process as claimed in claim 11, in which an output stream from one osmosis unit is used as an input stream for a second osmosis unit.

13. A process for the generation of electricity, which comprises:
extracting a saline stream from a geothermal formation;
(a) converting thermal energy present in said stream into electricity; and
(b) converting latent osmotic energy present in said stream into electricity by passage through an osmotic power unit in which said stream is passed over one side of a semi-permeable membrane which permits the passage of water but not the passage of salts, an aqueous stream of lower salinity than said stream being passed over the other side of said membrane.

14. A process as claimed in claim 13, in which step (a) is carried out before step (b).

15. A process as claimed in claim 13, in which step (a) is carried out by passing said stream through a heat exchanger.

16. A process as claimed in claim 13, in which the saline stream has a temperature of at least 45° C.

17. A process as claimed in claim 16, in which the saline stream has a temperature of at least 55° C.

18. A process as claimed in claim 13, in which the saline stream has a salt content of at least 10% wt.

19. A process as claimed in claim 18, in which the saline stream has a salt content of at least 15% wt.

20. A process as claimed in claim 13, in which the aqueous stream of lower salinity used in step (b) is sea water, fresh water or brackish water obtained from a river or lake, or waste water obtained from an industrial or municipal source.

21. A process as claimed in claim 13, in which the osmotic power unit contains more than one osmosis unit each comprising a semipermeable membrane which permits the passage of water but not the passage of salts.

22. A process as claimed in claim 21, in which an output stream from one osmosis unit is used as an input stream for a second osmosis unit.

* * * * *